(12) United States Patent
Shahkarami et al.

(10) Patent No.: US 11,308,413 B2
(45) Date of Patent: Apr. 19, 2022

(54) INTELLIGENT OPTIMIZATION OF FLOW CONTROL DEVICES

(71) Applicants: Alireza Shahkarami, Oklahoma City, OK (US); Guoxiang Liu, Edmond, OK (US); Naresh Sundaram Iyer, Ballston Spa, NY (US); Hayley Stephenson, Edmond, OK (US); Atul Kshirsagar, Aberdeen (GB); Tushar Patil, Aberdeen (GB); Colin Cranfield, Aberdeen (GB)

(72) Inventors: Alireza Shahkarami, Oklahoma City, OK (US); Guoxiang Liu, Edmond, OK (US); Naresh Sundaram Iyer, Ballston Spa, NY (US); Hayley Stephenson, Edmond, OK (US); Atul Kshirsagar, Aberdeen (GB); Tushar Patil, Aberdeen (GB); Colin Cranfield, Aberdeen (GB)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 622 days.

(21) Appl. No.: 16/258,335

(22) Filed: Jan. 25, 2019

(65) Prior Publication Data
US 2020/0242497 A1    Jul. 30, 2020

(51) Int. Cl.
*G06N 7/00* (2006.01)
*E21B 43/12* (2006.01)
(Continued)

(52) U.S. Cl.
CPC ............. *G06N 7/005* (2013.01); *E21B 43/12* (2013.01); *G06F 30/20* (2020.01); *G06F 2111/08* (2020.01); *G06F 2111/10* (2020.01)

(58) Field of Classification Search
CPC ........ G06N 7/005; G06N 5/003; G06N 20/00; G06F 30/20; G06F 2111/08;
(Continued)

(56) References Cited

U.S. PATENT DOCUMENTS

| 2011/0011595 A1 | 1/2011 | Huang et al. |
| 2011/0079384 A1 | 4/2011 | Russell et al. |

(Continued)

FOREIGN PATENT DOCUMENTS

WO    2012148688 A2    11/2012

OTHER PUBLICATIONS

Terry Stone et al., "Flow Control Valves and Inflow Control Devices Optimized for Wellbore Cleanup and Production," (Year: 2014).*
(Continued)

*Primary Examiner* — Steven W Crabb
(74) *Attorney, Agent, or Firm* — Cantor Colburn LLP

(57) ABSTRACT

A method for generating a well completion plan includes: evaluating a plurality of different well completion plans using a reservoir simulator to calculate dynamic flows of fluid through a subsurface formation, each well completion plan having a flow control device with location and associated flow setting or rating, and optionally a packer and location to provide output data for each well completion plan evaluation; developing a surrogate reservoir model using the output data and input data for each well completion plan evaluation; using intelligent sequential sampling of the output and input data for each well completion plan evaluation to provide intelligent sequential sampling data in response to the surrogate reservoir model not meeting a validation criterion; updating the surrogate reservoir model using the intelligent sequential sampling data; and iterating the using and the updating using a latest surrogate reservoir model until the latest surrogate reservoir model meets the validation criterion.

20 Claims, 5 Drawing Sheets

(51) Int. Cl.
*G06F 30/20* (2020.01)
*G06F 111/08* (2020.01)
*G06F 111/10* (2020.01)

(58) Field of Classification Search
CPC .. G06F 2111/10; G06F 2113/14; G06F 30/18; G06F 30/28; G06F 30/25; G06F 30/27; G06F 2111/00; G06F 2119/22; G06F 30/12; E21B 43/12; E21B 2200/22; E21B 43/14; E21B 33/00; G01V 99/005
See application file for complete search history.

(56) References Cited

U.S. PATENT DOCUMENTS

| | | |
|---|---|---|
| 2011/0079387 A1 | 4/2011 | Russell et al. |
| 2011/0238392 A1 | 9/2011 | Carvallo et al. |
| 2012/0278053 A1 | 11/2012 | Garcia et al. |
| 2014/0129199 A1 | 5/2014 | H. |
| 2014/0262235 A1* | 9/2014 | Rashid ............... E21B 43/12 166/250.01 |
| 2015/0100773 A1 | 4/2015 | Talbot et al. |
| 2017/0242410 A1 | 8/2017 | Iyer et al. |
| 2020/0102819 A1* | 4/2020 | Watanabe ............ E21B 43/00 |

OTHER PUBLICATIONS

Brochu, et al.; "A Tutorial on Bayesian Optimization of Expensive Cost Functions, with Application to Active User Modeling and Hierarchical Reinforcement Learning"; Dec. 14, 2010; Retrieved from https://arxiv.org/pdf/1012.2599v1.pdf; 49 pages.

Robertson et al. "Optimization of Unconventional Well-Pad Area Using Reservoir Simulation and Intelligent Sequential Sampling", Unconventional Resources Technology Conference, 2017, SPE/AAPG/SEG Unconventional Resources Technology Conference, Jul. 24-26, Austin, Texas, USA, 2 Pages.

International Search Report and the Written Opinion of the International Searching Authority for Application No. PCT/US2019/065960; dated Apr. 8, 2020; 8 Pages.

* cited by examiner

Evaluating with a processor a plurality of different well completion plans and designs for a well using a reservoir simulator that includes a detailed model of the subsurface formation to calculate dynamic flows of formation fluid through the subsurface formation, each well completion plan and design in the plurality having a flow control device, an adjustment setting or rating of the flow control device related to fluid flow through the flow control device and into or out tubing disposed in the well, and optionally a packer and location of the packer to provide output data for each well completion plan and design evaluation. —71

Developing with the processor a surrogate reservoir model using at least some of the output data and input data for each well completion plan and design evaluation. —72

Using intelligent sequential sampling of the output and input data for each well completion plan and design evaluation with the procesor to provide intelligent sequential sampling data in response to the surrogate reservoir model not meeting a validation criterion. —73

Updating with the processor the surrogate reservoir model using the intelligent sequential sampling data. —74

Iterating with the processor the using and the updating using a latest surrogate reservoir model until the latest surrogate reservoir model meets the validation criterion. —75

Calculating with the processor an objective function using the latest surrogate reservoir model and a proposed well completion plan and design. —76

Modifying with the processor the proposed well completion plan and design in response to the calculated objective function not meeting or converging to the selected objective. —77

Iterating with the processor the calculating and the modifying until the latest calculated objective function meets or converges to the selected objective. —78

Presenting the modified proposed completion plan in which the latest calculated objective function meets or converges to the selected objective to a user using a user interface. —79

FIG.5

INTELLIGENT OPTIMIZATION OF FLOW CONTROL DEVICES

BACKGROUND

Hydrocarbon fluids such as oil are typically extracted by production tubing disposed in a wellbore penetrating a reservoir of the hydrocarbon fluids. The hydrocarbon fluids can enter the production tubing via flow control devices, if such devices are installed. Flow control devices can also have application in production tubing and injection tubing in other situations. Water is typically injected into hydrocarbon reservoirs to maintain pressure and help sweep hydrocarbons to the production wells. Fluids such as gas or polymer solution can be injected into a hydrocarbon reservoir, in addition to other situations where fluids are produced or injected, such as in underground gas storage, cyclic steam injection, geothermal projects and steam-assisted gravity drainage.

Flow control devices (FCDs) come in various forms and settings, designed for varying fluid systems, properties, objectives, economics, etc. Passive inflow control devices (ICDs) are installed in production and injection wells and include devices that exhibit non-autonomous inflow control and devices that can exhibit autonomous inflow control (AICDs). A distinguishing feature of devices that exhibit autonomous inflow control is that their performance characteristics adapt independently, in a favorable manner, to the addition of an unwanted fluid flowing through it. Flow control devices termed outflow control devices are installed in injection wells to evenly distribute the injected fluid. Interval control valves (ICVs), which are controlled via a control line to surface or intervention, may also be installed in production and injection wells. These are active rather than passive flow control devices.

The basic functionality of all inflow control devices is to promote a more even inflow into the production tubing prior to breakthrough of an unwanted fluid. Outflow control devices promote a more even outflow from injection tubing. AICDs act autonomously following breakthrough of the unwanted fluid to a production well, by increasing the resistance to flow of the unwanted fluid once it starts to flow through the device.

In addition, flow control devices in general may be adjustable via a setting to control the degree of restriction that it applies to fluids flowing through it and the application of these settings can be either passive or active.

A well completion plan and design incorporating flow control devices, such as inflow control devices (for example ICDs and/or AICDs), also generally requires isolation of the annulus between the production tubing and wellbore into compartments along the length of the well by means of external packers. This prevents flow from entering the annulus from the reservoir and flowing freely along the annulus towards the heel of the well, negating the potential benefits of the flow control devices distributed along the production tubing.

The number of flow control devices required and their locations and settings are generally part of a well completion plan and design. Combinations of the number of flow control devices, their locations and settings and packer placement may lead to many scenarios for a well completion plan. Reservoir simulation is utilized to model a well completion plan and design before implementing it in a field. Generating a well completion plan may require many reservoir simulations using a reservoir simulator in order to optimize the number of flow control devices required and their locations and settings, and number and location of packers. Unfortunately, each reservoir simulation has a high computational cost and it may take several hours to days to perform one simulation. Hence, it would be well received in the hydrocarbon production industry if the computational time needed to generate a well completion plan and design could be reduced.

SUMMARY

Disclosed is a method for generating a well completion plan and design that meets or converges to a selected objective for a well penetrating a subsurface formation having a reservoir of a hydrocarbon fluid or a geothermal reservoir. The method includes: evaluating with a processor a plurality of different well completion plans and designs for the well using a reservoir simulator that includes a detailed model of the subsurface formation to calculate dynamic flows of fluid through the subsurface formation, each well completion plan and design in the plurality having a flow control device, a location of the flow control device, an adjustment setting or rating of the flow control device related to fluid flow through the flow control device and into or out of tubing disposed in the well, and optionally a packer and location of the packer to provide output data for each well completion plan and design evaluation; developing with the processor a surrogate reservoir model using at least some of the output data and input data for each well completion plan and design evaluation; using intelligent sequential sampling of the output and input data for each well completion plan and design evaluation with the processor to provide intelligent sequential sampling data in response to the surrogate reservoir model not meeting a validation criterion; updating with the processor the surrogate reservoir model using the intelligent sequential sampling data; iterating with the processor the using and the updating using a latest surrogate reservoir model until the latest surrogate reservoir model meets the validation criterion; calculating with the processor an objective function using the latest surrogate reservoir model and a proposed well completion plan and design; modifying with the processor the proposed well completion plan and design in response to the calculated objective function not meeting the selected objective; iterating with the processor the calculating and the modifying until the latest calculated objective function meets the selected objective; and presenting the modified proposed completion plan and design in which the latest calculated objective function meets the selected objective to a user using a user interface.

Also disclosed is a system for generating a well completion plan and design that meets a selected objective for a well penetrating a subsurface formation having a reservoir of a hydrocarbon fluid or a geothermal reservoir. The system includes a processor and a memory having instructions executable by the processor. The instructions are configured to: evaluate a plurality of different well completion plans and designs for the well using a reservoir simulator that includes a detailed model of the subsurface formation to calculate dynamic flows of fluid through the subsurface formation, each well completion plan and design in the plurality comprising a flow control device, an adjustment setting of the flow control device related to fluid flow through the flow control device and into or out of tubing disposed in the well, and optionally a packer and location of the packer to provide output data for each well completion plan and design evaluation; develop a surrogate reservoir model using at least some of the output data for each well completion plan and design evaluation; use intelligent sequential sampling of the output data for each well completion plan and design evaluation with the processor to provide intelligent sequential sampling data in response to the surrogate reservoir model not meeting a validation criterion; update the surrogate reservoir model using the intelligent sequential sampling data; iterate the using and the updating using the latest surrogate reservoir model until the latest surrogate reservoir model meets the validation criterion; calculate an objective function using the latest surrogate reservoir model and a proposed well completion plan; modify the proposed well completion plan and design in response to the calculated objective function not meeting the selected objective; and iterate the calculating, and the modifying until the latest calculated objective function meets the selected objective. The system also includes a user interface configured to present the modified proposed completion plan and design in which the latest calculated objective function meets the selected objective to a user.

BRIEF DESCRIPTION OF THE DRAWINGS

The following descriptions should not be considered limiting in any way. With reference to the accompanying drawings, like elements are numbered alike:

FIG. 5 presents a flow chart for a method for generating a well completion plan and design that meets or converges to a selected objective for a well penetrating a subsurface formation having a reservoir of a hydrocarbon fluid or a geothermal reservoir.

DETAILED DESCRIPTION

A detailed description of one or more embodiments of the disclosed apparatus and method are presented herein by way of exemplification and no limitation with reference to the Figures.

Disclosed are methods for optimizing a well completion plan for a reservoir of interest. The term "optimize" relates to meeting or converging to a selected objective. The methods involve using a number of simulations or runs of a reservoir simulator that models dynamic fluid flows in and out of the reservoir of interest using a detailed mathematical model of the reservoir. In each of the reservoir simulator runs, well completion parameters are varied. The well completion parameters may include a number of flow control devices required and their locations and settings. In addition, the well completion parameters may include a number of packers required and their locations. The input and output data from the reservoir simulator runs are extracted to form a spatio-temporal database. The input data is inclusive of reservoir characteristics and a proposed well completion plan and design. A surrogate model of the reservoir is developed using the spatiotemporal database. Machine learning techniques are used to develop the surrogate model from the spatio-temporal database. The surrogate model is a simplified mathematical model of the reservoir that provides the same output or close to the same output obtained from the reservoir simulations. In general, the surrogate model uses much less computational time to run than the dynamic flow simulations using the detailed reservoir model. For example, while it may take several hours to run the reservoir simulator model, the surrogate model can be run in less than an hour.

The surrogate model is validated using the input and output data from the reservoir simulator runs that have not been used during the development process of surrogate reservoir models. If the surrogate model is not validated, then machine learning techniques are employed for intelligent sequential sampling of data from the reservoir simulator runs to input other well completion parameters for an additional reservoir simulator run using the detailed model. The data from the additional run is used to update the spatio-temporal database and surrogate model. Once the surrogate model is validated, the surrogate model can be run using less computational time to optimize the well completion plan for an objective function such as an amount of oil to be extracted over a certain period of time. Artificial intelligence techniques and intelligent sequential sampling is used to quantify the accuracy of surrogate model.

It can be appreciated that once the optimized well completion plan is determined, then it may be implemented in the field by the installation of one or more of those completion components at corresponding locations and applicable settings detailed in the plan.

Figure 1:
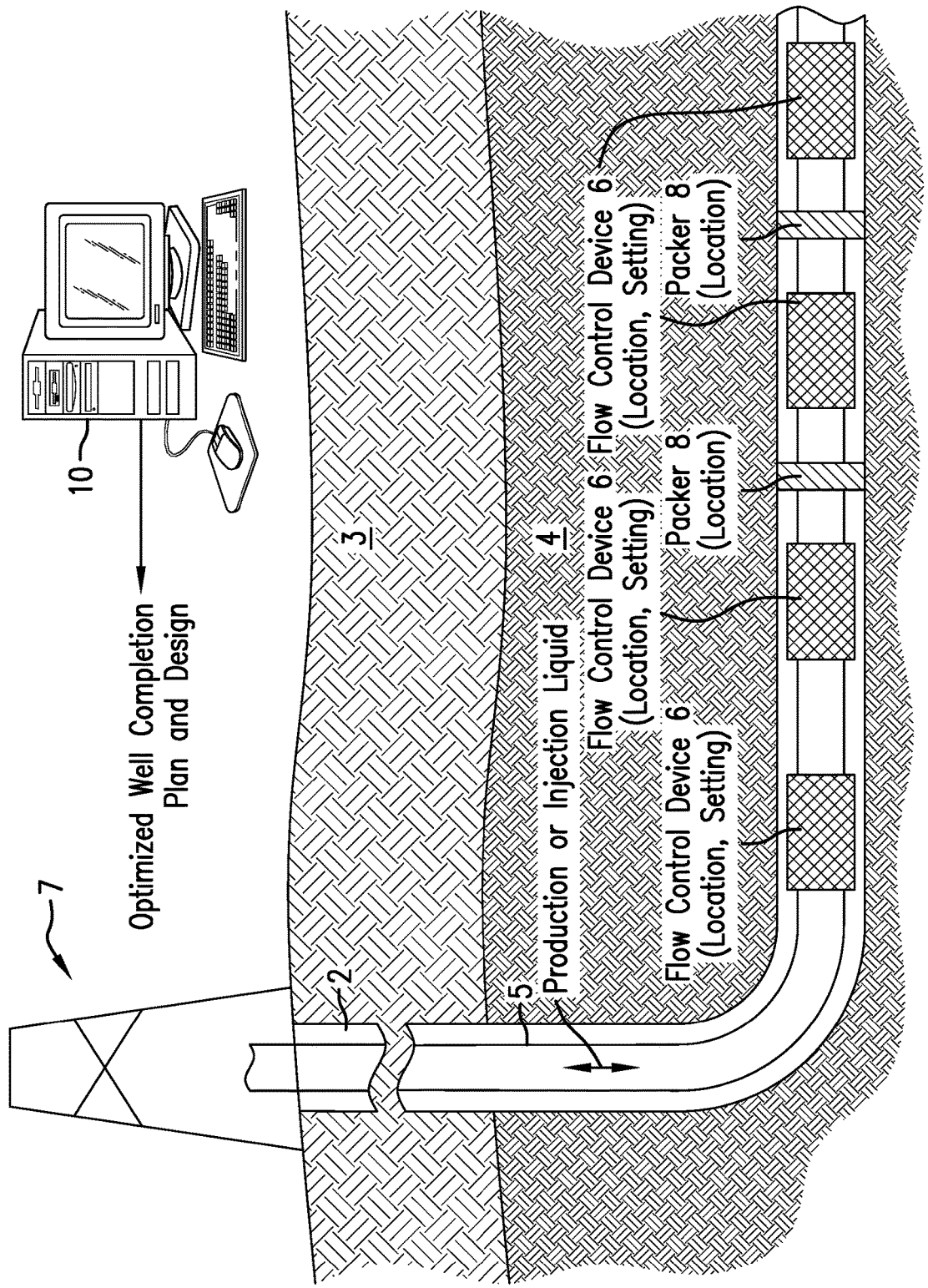
FIG. 1 illustrates a cross-sectional view of a production well penetrating a subsurface formation having a reservoir of hydrocarbons.

FIG. 1 illustrates a cross-sectional view of a well or wellbore 2 penetrating the earth 3 having a formation 4. The wellbore 2 can have vertical section, horizontal section or sections such as lateral wells, or section between vertical and horizontal such as a transition section between vertical and horizontal sections. The formation 4 includes a reservoir of a hydrocarbon (liquid and/or gas or a combination) or a geothermal reservoir (water) that is extracted to the surface of the earth 3 by tubing 5 disposed in the wellbore 2 or situations where fluids (water, gas, polymers, etc.) are injected into the surface of the earth 3 by tubing 5 disposed in the wellbore 2. In all situations, the fluid of interest enters or leaves the tubing 5 via inlets at flow control devices (ICDs, AICDs, ICVs, etc.), referred to as flow control devices 6. In the case of AICDs, each flow control device 6 has the ability to distinguish between the hydrocarbon fluid of interest (e.g., oil) and other formation fluids such as gas and/or water. By distinguishing between the hydrocarbon fluid of interest and an unwanted formation fluid, the autonomous behavior of the AICD flow control device 6 limits or restricts the inflow of the unwanted formation fluid into tubing 5. In addition, each flow control device 6 may have an adjustable setting that determines an amount of restriction of the unwanted formation fluids with respect to the desired inflow of the fluid of interest. In one or more embodiments, the flow control devices' setting is a flow resistance rating (FRR). The FRR of an ICD is generally defined to be the pressure drop in bar induced by water of 1 cP viscosity flowing through the device at flow rate of 188 barrels per day and is a function of the given flow control device's type and geometry. A rig/platform 7 includes those components needed for the production or injection of the fluid of interest. Non-limiting embodiments of those components include pumps, valves, piping, instrumentation and controls. The rig/platform 7 is configured to install completion components at specified locations and includes devices, such as a hoist for example, necessary to install those devices at the specified locations. In an optimized completion plan, the number of flow control devices 6 and their respective locations and flow settings are known so as to balance the inflow or outflow of the fluid of interest along the wellbore 2 so as to help delay breakthrough of the unwanted formation fluids, in case of production wells, so as to optimize an objective in one or more non-limiting embodiments. In one or more embodiments, the objective function may be a total amount of extracted oil, an inflow rate of oil, an amount of money that can be obtained from selling the extracted oil, and/or a return on investment, etc.

One or more packers 8 may also be disposed in the wellbore 2. Each packer 8 surrounds the tubing 5 and is configured to isolate an annulus surrounding the tubing 5 in one interval from the annulus in an adjacent interval. Hence, each packer 8 can prevent fluids in one interval from migrating into an adjacent interval to maintain the balanced flow of the fluid of interest into or out of the tubing 5 along the wellbore 2. If one or more packers 8 are needed, the number of packers 8 and their respective locations are also included in the optimized well completion plan.

A computer processing system 10 may be used to optimize the well completion plan by being configured to run the reservoir simulator having the detailed reservoir model and by being configured to run the surrogate reservoir model where running the surrogate reservoir model takes significantly less computational time than running the detailed reservoir model, such as for example one-fifth of the time or less. Aspects of the computer processing system 10 are discussed further below.

Figure 2:
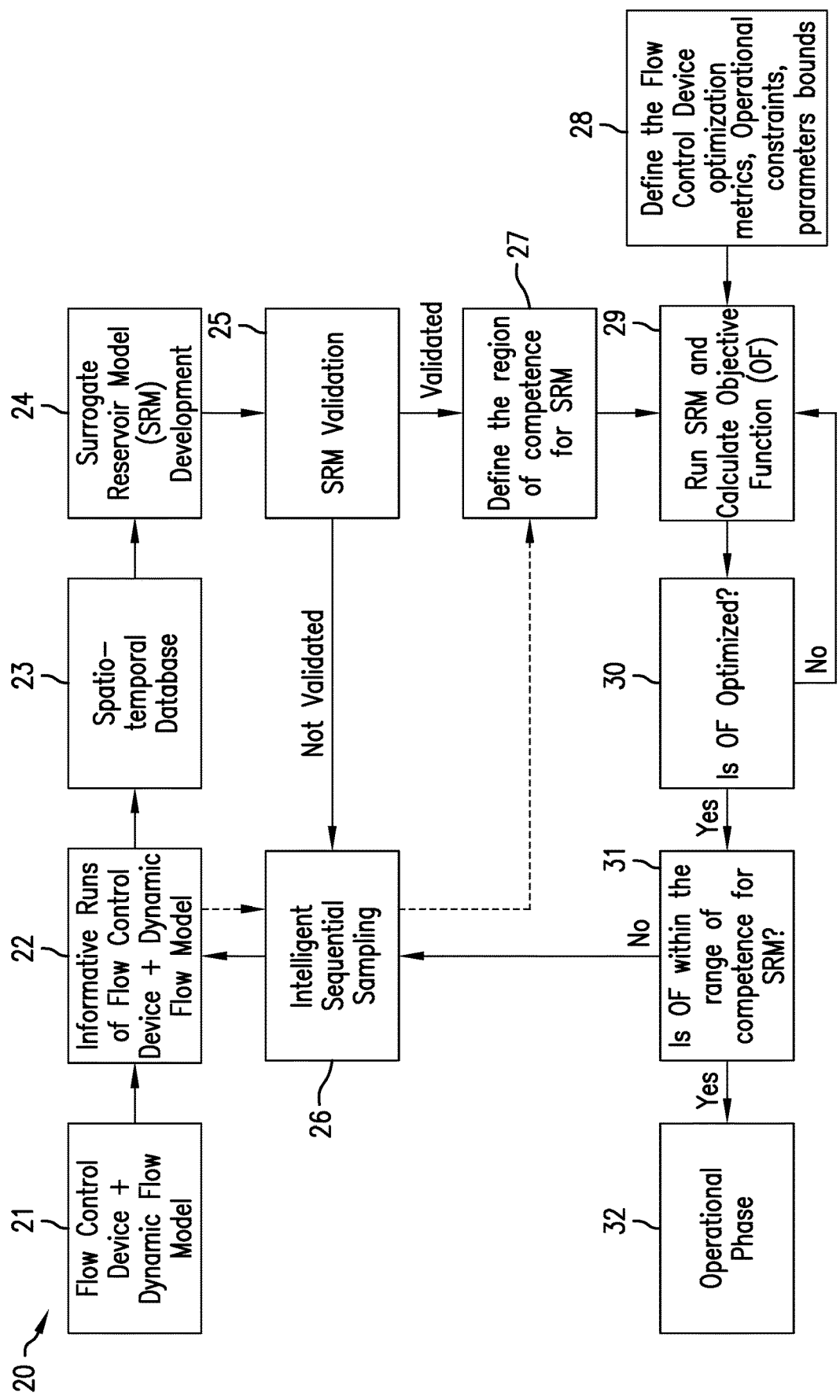
FIG. 2 is a flow chart for a method for generating an optimized well completion plan using flow control devices.

FIG. 2 is a flow chart for a method 20 for generating and implementing an optimized well completion plan. Block 21 calls for using a reservoir simulator having a processing system that executes or runs a detailed dynamic flow model of a reservoir in an earth formation. The detailed dynamic flow model is configured to model flows of formation fluids or injected fluids through the earth formation having the reservoir. The detailed dynamic flow model is also configured to model completion parameters such as flow control devices with their settings at specified locations and packers at specified locations. Output from each run of the reservoir simulator represents a value of a desired objective function. Non-limiting embodiments of the objective function include an amount of oil to be extracted over a certain period of time, an amount of money to be made from selling produced oil, and/or a return on investment. In one or more embodiments, the detailed mathematical model includes a plurality of cells (either two-dimensional or three-dimensional) that together represent the reservoir of interest. Associated with each volume cell is information that the processor uses in computing flow data or information, such as permeability, that is used to compute flows of fluids through the reservoir and into or out the tubing. Non-limiting embodiments of the cell information include physical location of the cell including depth, a number and size of fractures, orientation of the fractures, pore size distribution, and types of formation fluids present in the cell. Using the characteristics of each cell, the processor can calculate how each individual cell can influence the flow characteristics of adjoining cells and thus calculate flows of the formation fluids into or out the wellbore. The well completion parameters can be programmed into the reservoir simulator to calculate the flows of fluids through the tubing with the well completion parameters in place. Each run of the reservoir simulator uses different or varied well completion parameters in order to determine how those completion parameters affect the flows of the fluids into or out the pipe or tubing. In general, each run of the reservoir simulator may take several hours to complete due to the complexity of the detailed reservoir model and the number of mathematical calculations in the background.

Block 22 calls for performing a plurality of initial runs of the reservoir simulator where each of the runs has a set of completion parameters that are different from the sets of completion parameters used in the other runs.

Block 23 calls for creating a spatio-temporal database using input and output of the initial runs of the reservoir simulator. The spatio-temporal database includes static data and dynamic data. Non-limiting embodiments of the static data include reservoir characteristics such as permeability, porosity, and thickness as a function of location and wellbore characteristics such as lateral length, measured depth, and vertical depth. Non-limiting embodiments of the dynamic data include a number of compartments, location of packers, a number of flow control devices and their locations and settings, saturation, and pressure. Non-limiting embodiments of the dynamic data may also include oil production, water production, water injection, time of production, time of injection and production constraints. Data in the spatio-temporal database may be divided into two sets (1) a training set used to generate a surrogate reservoir model and (2) a validation set used to validate the generated surrogate reservoir model.

Block 24 calls for constructing a surrogate reservoir model using data in the spatio-temporal database. The initial reservoir simulator runs provide diverse output data or output values due to using different well completion parameter sets. In one or more embodiments, mathematical regression techniques or other machine learning algorithms are applied to the diverse output data or output values to construct the surrogate reservoir model. In general, the surrogate reservoir model is constructed so that the surrogate reservoir model, when run with the same completion parameters used in runs of the detailed dynamic flow model, provides the same output values or close to the same output values (i.e., within a selected range) as the original output values obtained by running the reservoir simulator with the detailed reservoir model. In one or more embodiments, Gaussian Processes (GP) are used as a means to build a surrogate model (or transfer function) of the underlying response surface. Gaussian Processes characterize an unknown function in terms of a Gaussian distribution over functions, fully specified by a mean value and a correlation structure on the sampling input space, expressed as a kernel function. The mean value models the expected value of the underlying function being modeled and the kernel models the properties of the input-output response surface like smoothness. Starting with an infinite set of functions, the process works by narrowing down the function-set. This is accomplished by conditioning it on actual values of the current set of sample evaluations using Bayesian estimation. An advantage of regression models is that they run almost instantaneously. This allows exploration of the idea of building regression models to emulate the underlying complex reservoir model. In this approach, an appropriate design of experiments approach is used to select the input samples (i.e., input completion parameters) that are evaluated using the reservoir model and used as data for constructing the regression or surrogate model. The construction of a surrogate model for the existing detailed reservoir model requires evaluation of the detailed reservoir model at pre-selected regions in the input space to ensure that the data will enable the regression model to capture the input-output relationship across the entire range of the input space. This can be quite challenging since it is not known how the output response surface behaves with respect to the input. Thus, it is not known which regions have higher complexity and non-linearity and which regions are relatively smooth. Prior knowledge of the response surface would be beneficial in order to be able to adequately design the sampling to be denser in regions that are complex and relatively sparser in regions that are smooth. This would allow the regression model to generalize better across the entire response surface. However, given that each reservoir simulator run using the detailed reservoir model is time consuming, evaluating samples that are redundant with respect to a previous sample in terms of information content is generally not done. Given that only a handful of samples can be evaluated, in numerical simulation, it becomes imperative to be information-driven and accurate in the choice of the samples. Thus, intelligent sampling techniques may be employed to construct the surrogate reservoir model. The generation of a surrogate model is also described in U.S. application Ser. No. 15/334,656, filed on 26 Oct. 2016, which is incorporated by reference herein in its entirety.

Block 25 calls for performing a validation process on the surrogate reservoir model to determine if the surrogate reservoir model is validated or non-validated. In one or more embodiments, the validation process runs the surrogate reservoir model and compares the output to the validation data set in the spatio-temporal database. In general, the data in the validation data set has not been used previously to develop the surrogate reservoir model. If the output is the same or within a specified range of the data in the validation data set, then the surrogate reservoir model is identified as being validated. If the output is not the same or outside of a specified range of the data in the validation data set, then the surrogate reservoir model is identified as being non-validated.

Block 26 calls for performing intelligent sequential sampling of the output from the initial runs of the reservoir simulator if the surrogate reservoir model is non-validated. The intelligent sequential sampling results in learning where more output data needs to be obtained for certain input completion parameters in an input sampling space by performing at least one further run of the detailed dynamic flow model in the reservoir simulator.

Intelligent sampling applies spatial correlation algorithms to sampled values to predict values at unsampled locations. Intelligent sampling addresses the dilemma of exploration (sampling from areas of high uncertainty) versus exploitation (sampling areas likely to offer improvement over the current best observation) by sampling adaptively and sequentially, as opposed to more traditional sampling methodologies that construct an entire sample set as a single batch. Sequential sampling proceeds by sampling iteratively, one sample at a time, for evaluation by the reservoir simulator. Every subsequent sample is designed by exploiting the additional information about the response surface gained from the samples evaluated thus far. By virtue of being adaptive in this fashion, sequential sampling can help understand and model a response surface well with a relatively smaller number of samples compared to more traditional sampling techniques. For illustrative purposes, a three-dimensional virtual surface can be created where the x- and y-axes represent two independent completion parameters (i.e. input parameter space) and the z-axis represents the output value that is be optimized (either in a maximum or minimum direction). The virtual surface is fit to the sampled values with the surface geometry between sampled values being used to predict output values for (x,y) points that were not sampled. The intelligent part of the sampling relates to selecting a new sample based on the underlying problem for which the samples are being extracted. In the absence of any further information, new samples are selected in regions where the variance of the output is the highest (this is often referred to as exploration). If there is additional information available (suppose for example optimizing the response to be minimum) then selection of the new sample is not only driven by the areas of high variance or uncertainty, but also by areas where the mean value of Gaussian Processes (used to create the response surface) is low (also referred to as exploitation). In the latter case, this trade-off between exploration and exploitation is done by computing an acquisition function over the entire sample space and selecting the next sample at the location where the acquisition function is improved. The acquisition function may be characterized as a multi-variable function in which one variable is uncertainty and another variable is a parameter or metric to be improved. In some embodiments, more than one parameter or metric may be improved. The selection of the next sample is not based on uncertainty.

Figure 3A:
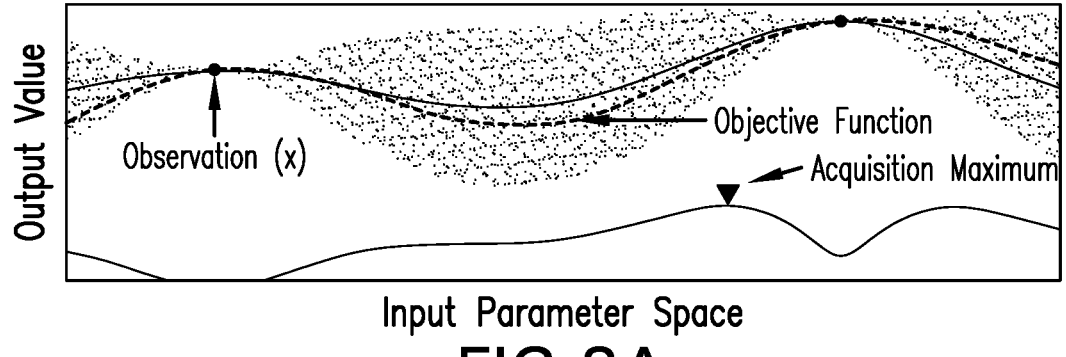
FIGS. 3A-3C, collectively referred to as FIG. 3, depict aspects of intelligent sequential sampling using Bayesian optimization.
Figure 3B:
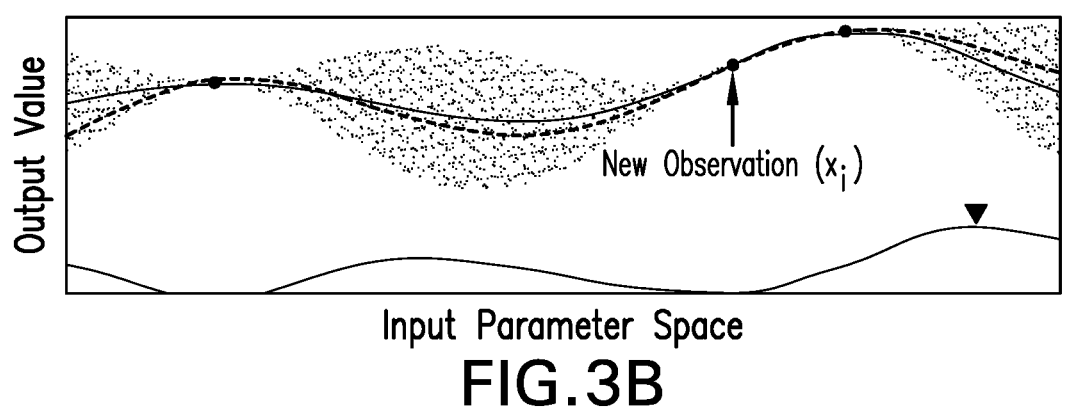
Figure 3C:
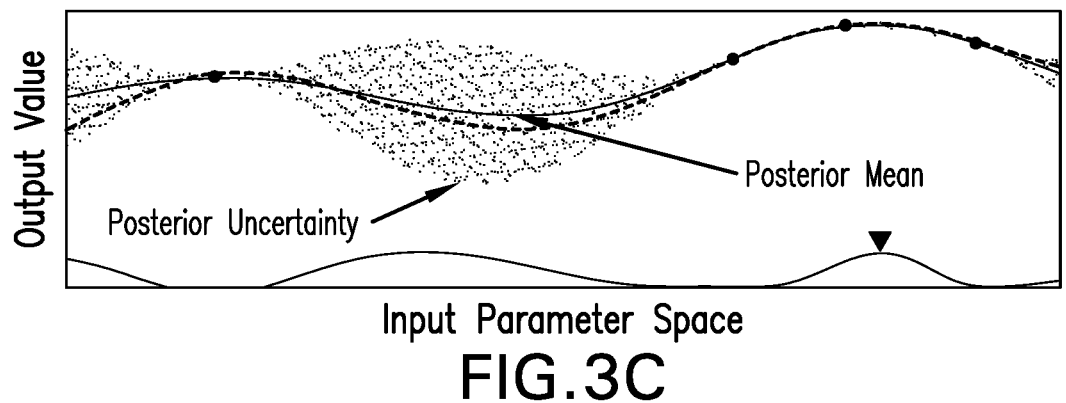

In one or more embodiments, intelligent sequential sampling uses Bayesian optimization. FIG. 3 illustrates an example of intelligent sequential sampling using Bayesian optimization. Each figure illustrates an objective function (upper solid line), an approximation of the objective function (upper dashed line), an acquisition function (lower solid line), and uncertainty noted by the gray area. In one or more embodiments, the acquisition is high where the Gaussian processes predict a high objective (exploitation) and where the prediction uncertainty is high (exploration). Input sample space areas that that have both attributes are sampled first. In FIG. 3A, a point of the objective function approximation curve is sampled where the acquisition function has a maximum value. The reservoir simulator is run using that sample point or space and the results are used to refine the objective function approximation curve such that for that input sample space the point on the objective function approximation curve is the same as the point on the objective function curve as illustrated in FIG. 3B. As seen in FIG. 3B, the acquisition function now has a new maximum. The sample point or space for that new acquisition maximum is now run in the reservoir simulator to obtain new data used to further refine the objective function approximation curve as illustrated in FIG. 3C. This optimization technique has the advantage in that it aims to minimize the number of objective function evaluations, thereby decreasing the number of runs of the reservoir simulator and required computational time. Further details of Bayesian optimization are described in *A Tutorial on Bayesian Optimization of Expensive Cost Functions, with Application to Active User Modeling and Hierarchical Reinforcement Learning* by Eric Brochu, Vlad M. Cora and Nando de Frreitas, Dec. 14, 2010.

Once the additional sample point or space is obtained by intelligent sampling, that sample point or space is used in an additional run of the reservoir simulator using the detailed dynamic flow model to obtain the output value or values for that sample point or space. The new output and input data from the additional run of the reservoir simulator is also stored in the spatio-temporal database and the surrogate reservoir model is updated using the new spatio-temporal database. The updated surrogate reservoir model then goes through the validation process again. In other words, blocks 22-26 are repeated or iterated in a loop until the latest updated surrogate reservoir model passes validation.

It can be appreciated that other machine learning or artificial intelligence (AI) techniques may be used for intelligent sequential sampling. These AI techniques may include the use of neural networks, Gaussian regression, and/or parametric curve fitting. Machine learning technologies can be used effectively to address this challenge for discovering the global optima solution in a relatively short time frame. Machine learning abounds with techniques for building models (e.g., the surrogate reservoir model) from data, more commonly referred to as regression. These techniques try to extract functional relationships that are implied in the data. The extraction of this functional relationship is done in a manner such that it explains the historical data well and does it in a manner that does not over-fit the data. By not over-fitting, the functional relationship captured by the regression model is expected to generalize to data that belongs to the same problem, but was not used in the construction of the model. This gives the model the ability to be predictive namely predict the value of an unknown variable (or variables) using the variables with known values.

Block 27 calls for defining a region of competence for the surrogate reservoir model. The region of competence relates to one or more regions of sample points or space for which there is sufficient confidence that the surrogate reservoir model can provide adequate output results. In general, sufficient confidence is a confidence level selected by the user based on an amount of accuracy of output required by the user. There can be a tradeoff between a desired amount of high accuracy and computational time required to achieve that high level. Hence, the level of confidence may be dependent on the amount of computational time available. Information obtained from the intelligent sequential sampling may be used to determine the region of competence. In one or more embodiments, the acquisition function used for the intelligent sequential sampling may be used to provide a quantitative indication of uncertainty in various regions of the input space.

Block 28 calls for defining well completion plan metrics such as well completion plan parameters, operational constraints, and bounds of parameters.

Block 29 calls for running the validated surrogate reservoir model and calculating an objective function to provide an objective function value.

Block 30 calls for determining if the objective function value is optimized. In one or more embodiments, the user has a priori knowledge of the earth formation and reservoir and, hence, may have an educated estimation as to what value or range of values the objective function should be. If the objective function value is not what is expected, then one or more of the optimization metrics in block 28 are modified and the validated surrogate reservoir model is run again. Once, the objective function is optimized, then the workflow proceeds to block 31.

Block 31 calls for determining if the objective function is within the region or range of competence of the surrogate reservoir model. If the objective function is not within the range of competence for the surrogate reservoir model, then the method 20 proceeds back to block 26 where additional intelligent sequential sampling on the detailed dynamic flow model is performed in order to update the surrogate reservoir model. The loop beginning in block 31 and proceeding to block 26 is iteratively performed until the objective function is determined to be within the range of competence. If the objective function is within the range of competence for the surrogate reservoir model, then the method 20 proceeds forward to block 32 where the optimized completion plan is physically implemented in an operational phase. In one or more embodiments, the operational phase involves installing and operating the components detailed in the optimized completion plan. For example, block 32 calls for installing and operating the flow control devices listed in the plan at the downhole locations listed in the plan to include adjusting the setting of each flow control device to the setting listed for each in the plan. Block 32 may also call for installing any packers listed in the plan at the corresponding locations listed in the plan. In one or more embodiments, the rig/platform 7 may be used to install and operate the optimized well completion components.

Figure 4:
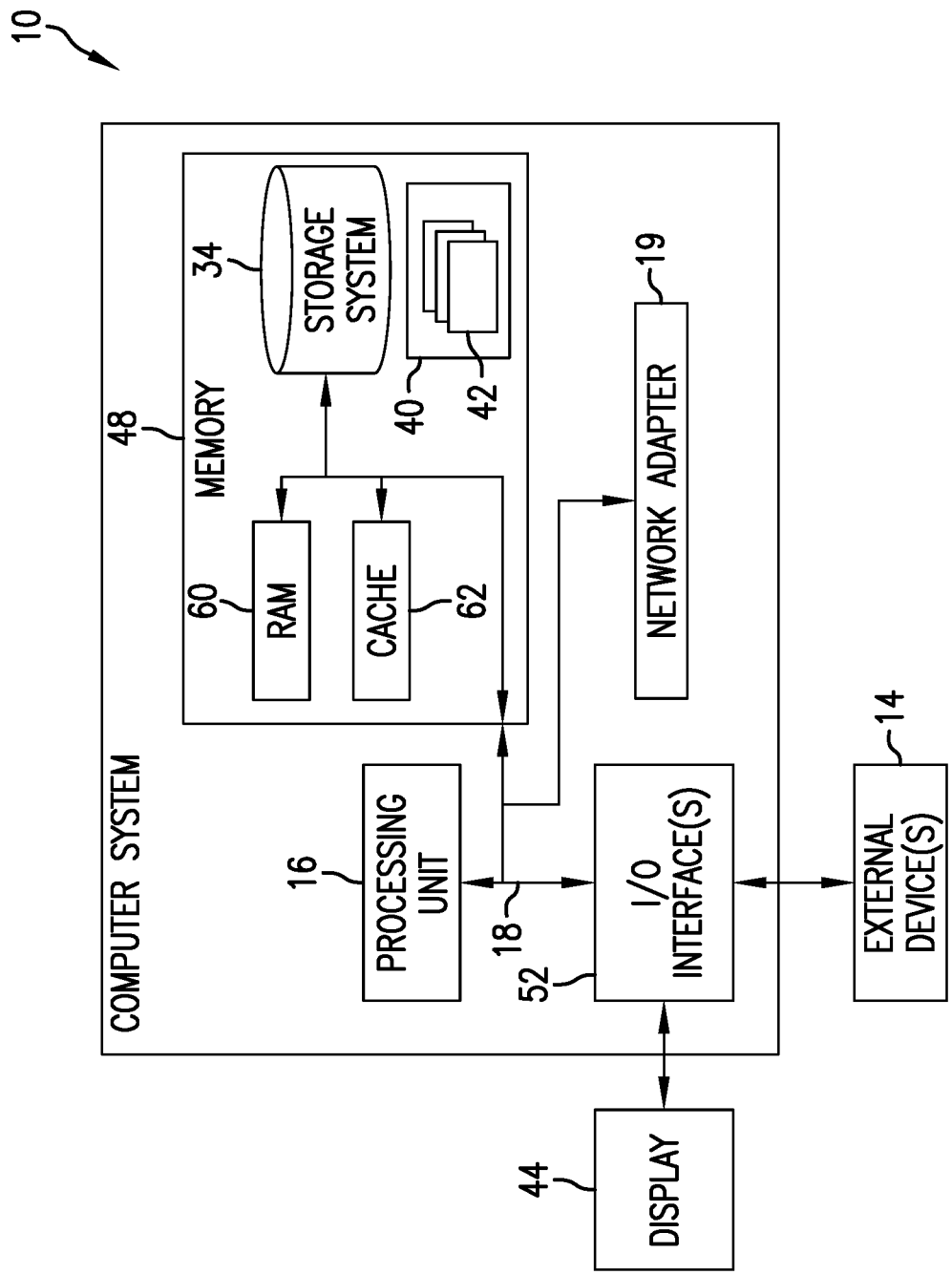
FIG. 4 depicts aspects of a computer processing system for implementing a method for generating an optimized well completion plan.

FIG. 4 depicts a block diagram of the computer system 10 for implementing the teachings disclosed herein according to an embodiment. Referring now to FIG. 4, a block diagram of the computer system 10 suitable for providing communication over cross-coupled links between independently managed compute and storage networks according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 4, computer system 10 is shown in the form of a general-purpose computing device, also referred to as a processing device. The components of computer system may include, but are not limited to, one or more processors or processing units 16, a system memory 48, and a bus 18 that couples various system components including system memory 48 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 48 can include computer system readable media in the form of volatile memory, such as random access memory (RAM) 60 and/or cache memory 62. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 48 may include at least one program product having a set (e.g., at least one) of program modules that are configured to carry out the functions of embodiments of the disclosure.

Program/utility 40, having a set (at least one) of program modules 42, may be stored in memory 48 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 44, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 52. Still yet, computer system 10 can communicate with one or more networks such as a local area network (LAN), a general wide area network (WAN), and/or a public network (e.g., the Internet) via network adapter 19. As depicted, network adapter 19 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

FIG. 5 presents a flow chart for a method 70 for generating a well completion plan that meets or converges to a selected objective for a well penetrating a subsurface formation having a reservoir of a hydrocarbon fluid or a geothermal reservoir. Block 71 calls for evaluating with a processor a plurality of different well completion plans and designs for the well using a reservoir simulator that includes a detailed model of the subsurface formation to calculate dynamic flows of fluid through the subsurface formation, each well completion plan and design in the plurality having a flow control device, a location of the flow control device, an adjustment setting or rating of the flow control device related to fluid flow through it and into or out the tubing disposed in the well, and optionally a packer and location of the packer to provide output data for each well completion plan evaluation. In one or more embodiments, the adjustment setting involves a flow resistance rating (FRR) for the corresponding flow control device. The term "rating" applies to a flow control device not having an adjustment setting and relates to a rated flow characteristic for that flow control device. In one or more embodiments, the location of each flow control device may include a depth or distance into the wellbore.

Block 72 calls for developing with the processor a surrogate reservoir model using at least some of the output and input data for each well completion plan evaluation. In one or more embodiments, the surrogate reservoir model is developed using a regression technique such as Gaussian Processes.

Block 73 calls for using intelligent sequential sampling of the output data for each well completion plan evaluation with the processor to provide intelligent sequential sampling data in response to the surrogate reservoir model not meeting a validation criterion. In one or more embodiments, the intelligent sequential sampling incorporates Bayesian optimization that uses an acquisition function to determine an input sample space where a next sequential sample output should be obtained. This block may also include applying a validation process to the surrogate reservoir model where validation is based on meeting a validation criterion.

Block 74 calls for updating with the processor the surrogate reservoir model using the intelligent sequential sampling data.

Block 75 calls for iterating with the processor the using and the updating using a latest surrogate reservoir model until the latest surrogate reservoir model meets the validation criterion.

Block 76 calls for calculating with the processor an objective function using the latest surrogate reservoir model and a proposed well completion plan and design.

Block 77 calls for modifying with the processor the proposed well completion plan and design in response to the calculated objective function not meeting or converging to the selected objective. In one or more embodiments, the modifying may include changing one or more locations of flow control devices or packers, changing the adjustable setting of one or more flow control devices, deleting flow control devices, adding flow control devices at new locations, and/or changing a type of the flow control device or devices.

Block 78 calls for iterating with the processor the calculating and the modifying until the latest calculated objective function meets or converges to the selected objective. When the latest calculated objective function meets or converges to the selected objective, then the corresponding modified proposed well completion plan and design may be referred to as the optimized well completion plan and design.

Block 79 calls for presenting the modified proposed completion plan and design in which the latest calculated objective function meets or converges to the selected objective to a user using a user interface. In one or more embodiments, the user interface can be a display, printer, or computer-readable medium.

The method 70 may also include implementing the modified completion plan and design in which the latest calculated objective function meets or converges to the selected objective using a rig/platform, which is configured to install completion devices such as flow control devices and packers at specified locations in the wellbore and extract or inject fluids with those completion devices installed. In one or more embodiments, an extracted fluid is oil.

It can be appreciated that by developing an accurate surrogate model using the techniques disclosed herein and using the surrogate model to optimize the well completion plan and design, the computer processing system 10 is improved by working more efficiently (i.e., by using less computational time) compared to the computer processing system 10 running the detailed reservoir model to optimize the well completion plan and design.

Set forth below are some embodiments of the foregoing disclosure:

Embodiment 1. A method for generating a well completion plan and design that meets or converges to a selected objective for a well penetrating a subsurface formation having a reservoir of a hydrocarbon fluid or a geothermal reservoir, the method comprising: evaluating with a processor a plurality of different well completion plans and designs for the well using a reservoir simulator that includes a detailed model of the subsurface formation to calculate dynamic flows of fluid through the subsurface formation, each well completion plan and design in the plurality comprising a flow control device, a location of the flow control device, an adjustment setting or rating of the flow control device related to fluid flow through the flow control device and into or out of tubing disposed in the well, and optionally a packer and location of the packer to provide output data for each well completion plan and design evaluation; developing with the processor a surrogate reservoir model using at least some of the output data and input data for each well completion plan and design evaluation; using intelligent sequential sampling of the output and input data for each well completion plan and design evaluation with the processor to provide intelligent sequential sampling data in response to the surrogate reservoir model not meeting a validation criterion; updating with the processor the surrogate reservoir model using the intelligent sequential sampling data; iterating with the processor the using and the updating using a latest surrogate reservoir model until the latest surrogate reservoir model meets the validation criterion; calculating with the processor an objective function using the latest surrogate reservoir model and a proposed well completion plan and design; modifying with the processor the proposed well completion plan and design in response to the calculated objective function not meeting the selected objective; iterating with the processor the calculating and the modifying until the latest calculated objective function meets the selected objective; and presenting the modified proposed completion plan and design in which the latest calculated objective function meets the selected objective to a user using a user interface.

Embodiment 2. The method according to any prior embodiment, further comprising implementing the modified completion plan and design in which the latest calculated objective function meets or converges to the selected objective using a rig/platform.

Embodiment 3. The method according to any prior embodiment, wherein the objective function comprises at least one of an amount of oil that can be produced, an amount of money to be made from produced oil, and a return on investment.

Embodiment 4. The method according to any prior embodiment, wherein the flow control device comprises an inflow control device (ICD), an autonomous inflow control device (AICD), an interval control valve (ICV), and/or an outflow control device.

Embodiment 5. The method according to any prior embodiment, wherein developing a surrogate reservoir model comprises applying regression to the output data for each well completion plan evaluation using Gaussian Processes that characterize an unknown function in terms of a Gaussian distribution over functions, specified by a mean value and a correlation structure on sampling input space.

Embodiment 6. The method according to any prior embodiment, further comprising using intelligent sequential sampling to obtain locations in the sampling input space to obtain samples to which the Gaussian Processes are applied.

Embodiment 7. The method according to any prior embodiment, wherein intelligent sequential sampling comprises sampling iteratively one sample at a time, modeling an output response for each sample, and exploiting the output response to determine where in input space to sample a subsequent sample.

Embodiment 8. The method according to any prior embodiment, wherein the intelligent sequential sampling comprises selecting a sequential sampling point based on the sampling point having a maximum value of an acquisition function.

Embodiment 9. The method according to any prior embodiment, further comprising evaluating another different well completion plan using the reservoir simulator based on the intelligent sequential sampling data to provide another output data corresponding to the another different well completion plan.

Embodiment 10. The method according to any prior embodiment, wherein a first portion of the output data for each well completion plan evaluation is used to develop the surrogate reservoir model and a second portion of the output data for each well completion plan evaluation is used for the validation criterion.

Embodiment 11. The method according to claim 1, further comprising: defining a region of competence for the latest surrogate reservoir model; determining if the latest calculated objective function is within the region of competence for the latest surrogate reservoir model; iterating the intelligent sequential sampling based on the latest calculated objective function not being within the region of competence for the latest surrogate reservoir model in order to update the surrogate reservoir model; and proceeding to implement the optimized well completion plan and design based on the latest calculated objective function being within the region of competence for the latest surrogate reservoir model.

Embodiment 12. A system for generating a well completion plan and design that meets a selected objective for a well penetrating a subsurface formation having a reservoir of a hydrocarbon fluid or a geothermal reservoir, the system comprising: a processor; a memory comprising instructions executable by the processor, the instructions being configured to: evaluate a plurality of different well completion plans and designs for the well using a reservoir simulator that includes a detailed model of the subsurface formation to calculate dynamic flows of fluid through the subsurface formation, each well completion plan and design in the plurality comprising a flow control device, an adjustment setting of the flow control device related to fluid flow through the flow control device and into or out of tubing disposed in the well, and optionally a packer and location of the packer to provide output data for each well completion plan and design evaluation; develop a surrogate reservoir model using at least some of the output data for each well completion plan and design evaluation; use intelligent sequential sampling of the output data for each well completion plan and design evaluation with the processor to provide intelligent sequential sampling data in response to the surrogate reservoir model not meeting a validation criterion;

update the surrogate reservoir model using the intelligent sequential sampling data; iterate the using and the updating using the latest surrogate reservoir model until the latest surrogate reservoir model meets the validation criterion; calculate an objective function using the latest surrogate reservoir model and a proposed well completion plan; modify the proposed well completion plan and design in response to the calculated objective function not meeting the selected objective; and iterate the calculating, and the modifying until the latest calculated objective function meets the selected objective; a user interface configured to present the modified proposed completion plan and design in which the latest calculated objective function meets the selected objective to a user.

Embodiment 13. The system according to any prior embodiment, further comprising a rig/platform configured to implement the modified completion plan and design in which the latest calculated objective function meets or converges to the selected objective.

Embodiment 14. The system according to any prior embodiment, wherein the objective function comprises at least one of an amount of oil that can be produced, an amount of money to be made from produced oil, and a return on investment.

Embodiment 15. The system according to any prior embodiment, wherein in order to develop the surrogate reservoir model the instructions are further configured to apply regression to the output data for each well completion plan evaluation using Gaussian Processes that characterize an unknown function in terms of a Gaussian distribution over functions, specified by a mean value and a correlation structure on sampling input space.

Embodiment 16. The system according to any prior embodiment, wherein the instructions are further configured to use intelligent sequential sampling to obtain locations in the sampling input space to obtain samples to which the Gaussian Processes are applied.

Embodiment 17. The system according to any prior embodiment, wherein intelligent sequential sampling comprises sampling iteratively one sample at a time, modeling an output response for each sample, and exploiting the output response to determine where in input space to sample a subsequent sample.

Embodiment 18. The system according to any prior embodiment, wherein the intelligent sequential sampling comprises selecting a sequential sampling point based on the sampling point having a maximum value of an acquisition function.

Embodiment 19. The system according to any prior embodiment, wherein the instructions are further configured to evaluate another different well completion plan and design using the reservoir simulator based on the intelligent sequential sampling data to provide another output data corresponding to the another different well completion plan and design.

Embodiment 20. The system according to any prior embodiment, wherein a first portion of the output data for each well completion plan and design evaluation is used to develop the surrogate reservoir model and a second portion of the output data for each well completion plan and design evaluation is used for the validation criterion.

Embodiment 21. The system according to any prior embodiment, wherein the instructions are further configured to: define a region of competence for the latest surrogate reservoir model; determine if the latest calculated objective function is within the region of competence for the latest surrogate reservoir model; iterate the intelligent sequential sampling based on the latest calculated objective function not being within the region of competence for the latest surrogate reservoir model in order to update the surrogate reservoir model; and provide the latest proposed well completion plan and design as the optimized well completion plan and design based on the latest calculated objective function being within the region of competence for the latest surrogate reservoir model.

Embodiment 22. The system according to any prior embodiment, wherein the flow control device comprises an inflow control device (ICD), an autonomous inflow control device (AICD), an interval control valve (ICV), and/or an outflow control device.

In support of the teachings herein, various analysis components may be used, including a digital and/or an analog system. For example, the computer processing system 10 may include a digital and/or analog system. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer-readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagrams depicted herein just examples. There may be many variations to these diagrams or the steps (or operations) described therein without departing from the inventive idea of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method for generating a well completion plan and design that meets or converges to a selected objective for a well penetrating a subsurface formation having a reservoir of a hydrocarbon fluid or a geothermal reservoir, the method comprising:

evaluating with a processor a plurality of different well completion plans and designs for the well using a reservoir simulator that includes a detailed model of the subsurface formation to calculate dynamic flows of fluid through the subsurface formation, each well completion plan and design in the plurality comprising a flow control device, a location of the flow control device, an adjustment setting or rating of the flow control device related to fluid flow through the flow control device and into or out of tubing disposed in the well, and optionally a packer and location of the packer to provide output data for each well completion plan and design evaluation resulting in a plurality of output data sets, the plurality of output data sets comprising a first data set comprising first evaluation output data corresponding to first input data and a second data set comprising second evaluation output data corresponding to second input data, the second data set being different from the first data set;

developing with the processor a surrogate reservoir model using at least some of the first data set;

using intelligent sequential sampling of the first data set for with the processor to provide intelligent sequential sampling data in response to the surrogate reservoir model not meeting a validation criterion based on the second data set;

updating with the processor the surrogate reservoir model using the intelligent sequential sampling data;

iterating with the processor the using and the updating using a latest surrogate reservoir model until the latest surrogate reservoir model meets the validation criterion;

calculating with the processor an objective function using the latest surrogate reservoir model and a proposed well completion plan and design;

modifying with the processor the proposed well completion plan and design in response to the calculated objective function not meeting the selected objective;

iterating with the processor the calculating and the modifying until the latest calculated objective function meets the selected objective; and presenting the modified proposed completion plan and design in which the latest calculated objective function meets the selected objective to a user using a user interface.

2. The method according to claim 1, further comprising implementing the modified completion plan and design in which the latest calculated objective function meets or converges to the selected objective using a rig/platform.

3. The method according to claim 1, wherein the objective function comprises at least one of an amount of oil that can be produced, an amount of money to be made from produced oil, and a return on investment.

4. The method according to claim 1, wherein the flow control device comprises an inflow control device (ICD), an autonomous inflow control device (AICD), an interval control valve (ICV), and/or an outflow control device.

5. The method according claim 1, wherein developing a surrogate reservoir model comprises applying regression to the output data for each well completion plan evaluation using Gaussian Processes that characterize an unknown function in terms of a Gaussian distribution over functions, specified by a mean value and a correlation structure on sampling input space.

6. The method according to claim 5, further comprising using intelligent sequential sampling to obtain locations in the sampling input space to obtain samples to which the Gaussian Processes are applied.

7. The method according to claim 1, wherein intelligent sequential sampling comprises sampling iteratively one sample at a time, modeling an output response for each sample, and exploiting the output response to determine where in input space to sample a subsequent sample.

8. The method according to claim 7, wherein the intelligent sequential sampling comprises selecting a sequential sampling point based on the sampling point having a maximum value of an acquisition function.

9. The method according to claim 1, further comprising evaluating another different well completion plan using the reservoir simulator based on the intelligent sequential sampling data to provide another output data corresponding to the another different well completion plan.

10. The method according to claim 1, further comprising:

defining a region of competence for the latest surrogate reservoir model;

determining if the latest calculated objective function is within the region of competence for the latest surrogate reservoir model;

iterating the intelligent sequential sampling based on the latest calculated objective function not being within the region of competence for the latest surrogate reservoir model in order to update the surrogate reservoir model; and proceeding to implement the optimized well completion plan and design based on the latest calculated objective function being within the region of competence for the latest surrogate reservoir model.

11. A system for generating a well completion plan and design that meets a selected objective for a well penetrating a subsurface formation having a reservoir of a hydrocarbon fluid or a geothermal reservoir, the system comprising:

a processor;

a memory comprising instructions executable by the processor, the instructions being configured to:

evaluate a plurality of different well completion plans and designs for the well using a reservoir simulator that includes a detailed model of the subsurface formation to calculate dynamic flows of fluid through the subsurface formation, each well completion plan and design in the plurality comprising a flow control device, an adjustment setting of the flow control device related to fluid flow through the flow control device and into or out of tubing disposed in the well, and optionally a packer and location of the packer to provide output data for each well completion plan and design evaluation resulting in a plurality of output data sets, the plurality of output data sets comprising a first data set comprising first evaluation output data corresponding to first input data and a second data set comprising second evaluation output data corresponding to second input data, the second data set being different from the first data set;

develop a surrogate reservoir model using at least some of the first data set;

use intelligent sequential sampling of the first data set with the processor to provide intelligent sequential sampling data in response to the surrogate reservoir model not meeting a validation criterion based on the second data set;

update the surrogate reservoir model using the intelligent sequential sampling data;

iterate the using and the updating using the latest surrogate reservoir model until the latest surrogate reservoir model meets the validation criterion;

calculate an objective function using the latest surrogate reservoir model and a proposed well completion plan;

modify the proposed well completion plan and design in response to the calculated objective function not meeting the selected objective; and iterate the calculating, and the modifying until the latest calculated objective function meets the selected objective;

a user interface configured to present the modified proposed completion plan and design in which the latest calculated objective function meets the selected objective to a user.

12. The system according to claim 11, further comprising a rig/platform configured to implement the modified completion plan and design in which the latest calculated objective function meets or converges to the selected objective.

13. The system according to claim 11, wherein the objective function comprises at least one of an amount of oil that can be produced, an amount of money to be made from produced oil, and a return on investment.

14. The system according to claim 11, wherein in order to develop the surrogate reservoir model the instructions are further configured to apply regression to the output data for each well completion plan evaluation using Gaussian Processes that characterize an unknown function in terms of a Gaussian distribution over functions, specified by a mean value and a correlation structure on sampling input space.

15. The system according to claim 14, wherein the instructions are further configured to use intelligent sequential sampling to obtain locations in the sampling input space to obtain samples to which the Gaussian Processes are applied.

16. The system according to claim 11, wherein intelligent sequential sampling comprises sampling iteratively one sample at a time, modeling an output response for each sample, and exploiting the output response to determine where in input space to sample a subsequent sample.

17. The system according to claim 16, wherein the intelligent sequential sampling comprises selecting a sequential sampling point based on the sampling point having a maximum value of an acquisition function.

18. The system according to claim 11, wherein the instructions are further configured to evaluate another different well completion plan and design using the reservoir simulator based on the intelligent sequential sampling data to provide another output data corresponding to the another different well completion plan and design.

19. The system according to claim 11, wherein the instructions are further configured to:

define a region of competence for the latest surrogate reservoir model;

determine if the latest calculated objective function is within the region of competence for the latest surrogate reservoir model;

iterate the intelligent sequential sampling based on the latest calculated objective function not being within the region of competence for the latest surrogate reservoir model in order to update the surrogate reservoir model; and provide the latest proposed well completion plan and design as the optimized well completion plan and design based on the latest calculated objective function being within the region of competence for the latest surrogate reservoir model.

20. The system according to claim 11, wherein the flow control device comprises an inflow control device (ICD), an autonomous inflow control device (AICD), an interval control valve (ICV), and/or an outflow control device.

* * * * *